July 11, 1950     C. C. LAURITSEN ET AL     2,515,049
ROCKET MOTOR RELIEF MEANS CONSTRUCTION
Filed Aug. 25, 1945     3 Sheets-Sheet 1
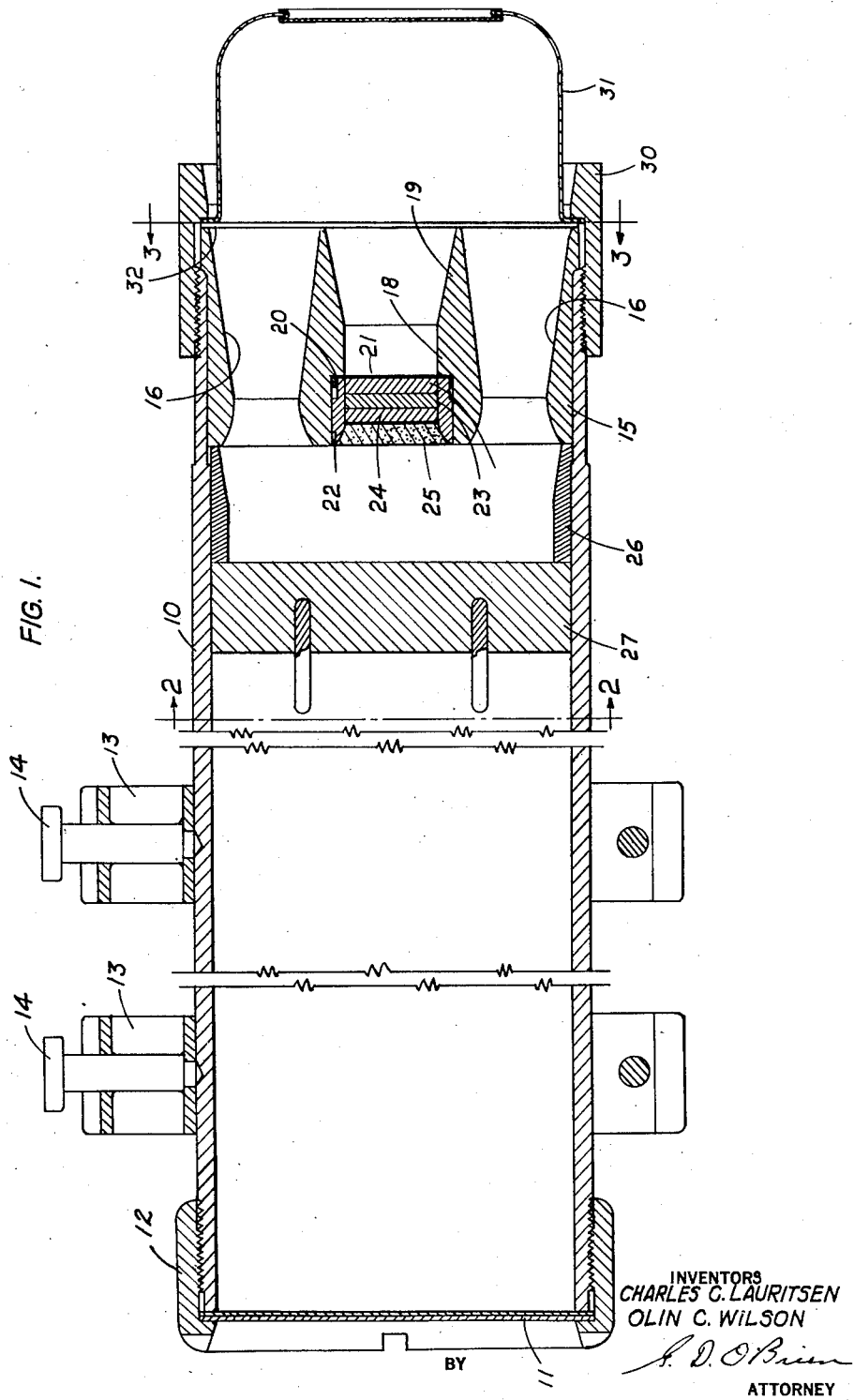
INVENTORS
CHARLES C. LAURITSEN
OLIN C. WILSON
ATTORNEY July 11, 1950  C. C. LAURITSEN ET AL  2,515,049
ROCKET MOTOR RELIEF MEANS CONSTRUCTION
Filed Aug. 25, 1945  3 Sheets-Sheet 2

INVENTORS
CHARLES C. LAURITSEN
OLIN C. WILSON
ATTORNEY

July 11, 1950 C. C. LAURITSEN ET AL 2,515,049
ROCKET MOTOR RELIEF MEANS CONSTRUCTION
Filed Aug. 25, 1945 3 Sheets-Sheet 3
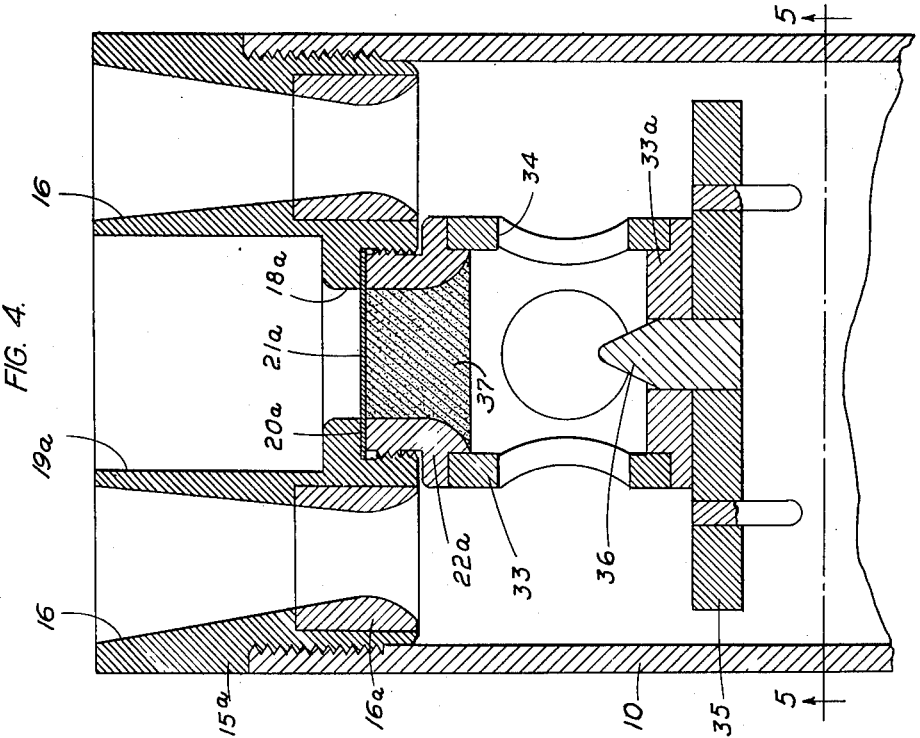
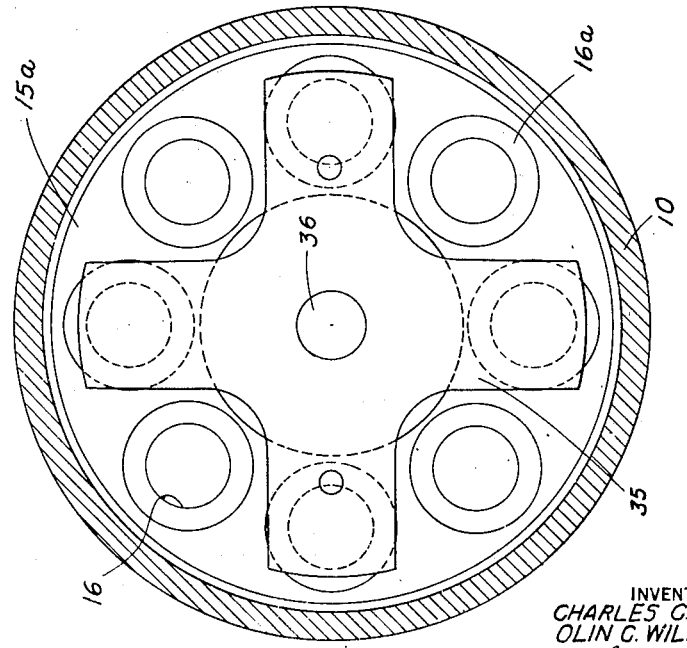
INVENTORS
CHARLES C. LAURITSEN
OLIN C. WILSON
BY
ATTORNEY Patented July 11, 1950

2,515,049

UNITED STATES PATENT OFFICE 2,515,049

ROCKET MOTOR RELIEF MEANS CONSTRUCTION

Charles C. Lauritsen and Olin C. Wilson, Pasadena, Calif., assignors to the United States of America as represented by the Secretary of the Navy Application August 25, 1945, Serial No. 612,608

5 Claims. (Cl. 60—35.6)

This invention relates to pressure relief means for multiple nozzle rocket motors, and more particularly to a novel pressure relief means which is also adapted to act as an additional nozzle in driving the rocket.

One object of the invention is to provide a pressure relief means for multiple nozzle rocket motors, which materially increases the temperature range through which a rocket may be safely fired.

Another object is to provide a pressure relief means for rocket motors which comprises an auxiliary nozzle closed by a shear disk so protected that the heat generated within the rocket motor does not appreciably affect the shear strength of the disk, whereby the pressure relief means is inherently reliable.

A further object is to provide a pressure relief means for multiple nozzle rocket motors which not only functions as a relief valve but also as an added nozzle when in operation.

Still another object is to provide a means of the character described which in no way interferes with normal operation of the rocket or adversely affects its flight characteristics.

Another object of the invention is to provide a pressure relief means for multiple nozzle rocket motors which does not increase the weight of the rocket.

An additional object is to provide a means of the character described which may be incorporated in either spinning or non-spinning multiple nozzle rocket motors and, because of the greater safety afforded, is particularly desirable for use in rockets designed for discharge from automatic launchers.

These and other objects of the invention may be better understood by reference to the accompanying drawings, in which:

Fig. 1 is a longitudinal sectional view of part of a rocket embodying one form of the new pressure relief means.

Figure 3:
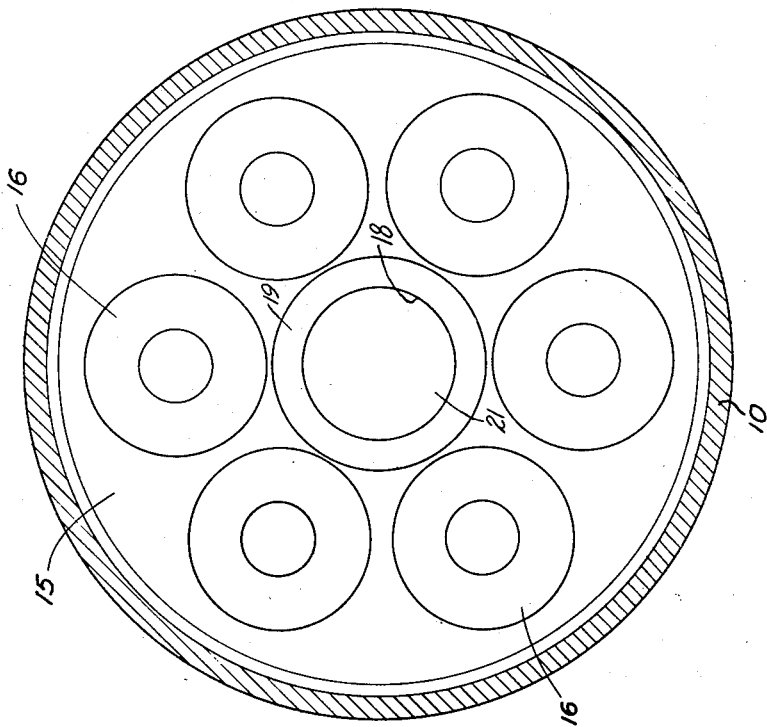
Figure 2:
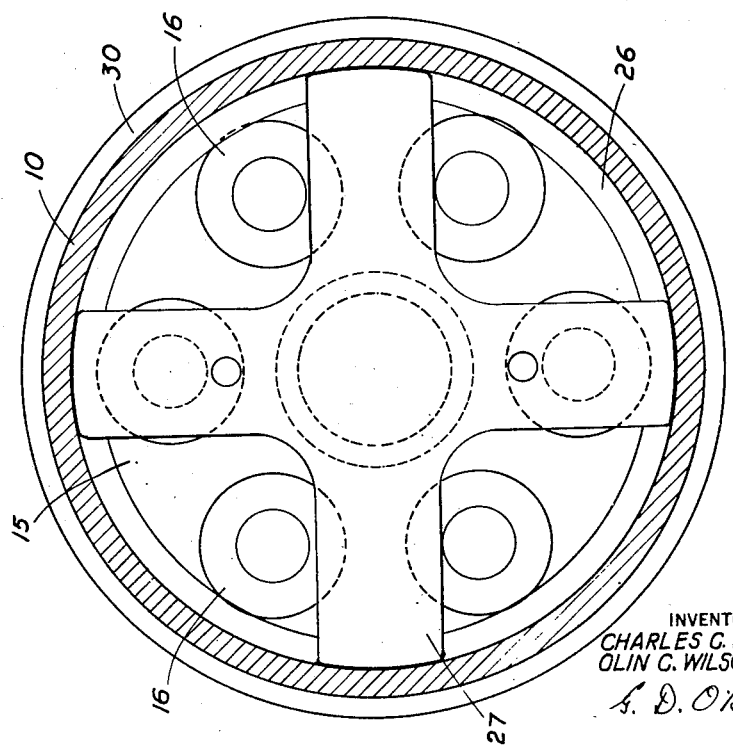

Figs. 2 and 3 are sectional views on the lines 2—2 and 3—3, respectively, in Fig. 1;

Fig. 4 is a longitudinal sectional view of part of a rocket embodying a modified form of the new pressure relief means, and Fig. 5 is a sectional view on the line 5—5 in Fig. 4.

The rocket includes a motor tube 10 adapted to receive a propellant grain and igniter (not shown), as disclosed in copending applications of C. C. Lauritsen, Ser. Nos. 481,644 and 481,645, filed April 2, 1943, now Patents 2,464,181, issued March 8, 1949, and 2,469,350, issued May 10, 1949, respectively. The motor tube 10, as shown, is closed at its front end by gasket and disc members 11 which are clamped in position by a cap 12 screwed on the tube. A pay load (not shown) may be connected to the front end of the motor tube 10. The particular type of rocket herein illustrated is provided with lug bands 13 near the front and rear ends of the motor tube, the bands having headed pins 14 for supporting the rocket in the guide slot of a suitable launcher. The motor tube 10 may be provided on its rear end portion with the usual fins (not shown).

The rear end of the motor tube 10 receives a nozzle block or disk 15 in which are formed several nozzles 16 positioned about a common center. The nozzle block is provided with a central opening forming a relief port 18. Outwardly from the port 18 the central opening through the nozzle block is enlarged forming a clearance socket 19. A forwardly facing shoulder 20 is formed in the relief port 18, this shoulder being the bottom of a cavity in the nozzle block, formed by counterboring the inner end of the port 18. A cup-shaped shear disc 21 is seated on the shoulder. The disc 21 is clamped against the shoulder by a ring 22 threaded or otherwise secured in the front end portion of the port 18, the rear end of the ring being received in the shear disc 21. Two asbestos disks 23 are placed within the ring 22 over the exposed portion of disk 21. Adjacent the disks 23 is a fiber disk 24, and the remaining portion of ring 22 is filled with permatex or similar putty-like material 25.

In front of the nozzle block 15 is a ring 26 fitted snugly in the motor tube and engaging the adjacent end of the nozzle block. A cruciform grid 27 is mounted in the tube in front of the ring 26 with the extremities of the grid legs resting on the ring. The purpose of the grid 27 is to support and retain the propellant grain in the motor tube 10.

The nozzle block 15 has a light press fit in the motor tube 10 and is held by a retainer ring 30 which also may be used to hold the fins (not shown) on the motor tube. The ring 30 is threaded over the rear end portion of the motor tube and clamps the flange of a cup-shaped end closure 31 against the rear end of nozzle block 15, a sealing gasket 32 being interposed between the parts. By reason of the cup shape of closure member 31, the latter is adapted to store the usual lead wires from the electrical igniter (not shown) in the front portion of the motor tube, and the usual terminal plug at the ends of the wires. It will be understood that the lead wires and plug, the details of which are disclosed in a copending application of C. C. Lauritsen et al. Ser. No. 481,652, filed April 2, 1943, now Patent No. 2,458,475, issued January 4, 1949, serve to connect the igniter electrically to the firing means on the launcher, the wires extending through one of the ports in nozzle plate 15 and through the grid 27. The rocket motor is shipped with the usual fins removed, and the latter are placed on the motor in the field by removing the ring 30, sliding the fins on the motor tube 10, and then replacing the ring 30. At the same time, the closure member 31 is permanently removed so that the terminal plug for the igniter is available for connection to the launcher firing means.

In operation, when the propellant grain in the motor tube 10 is ignited by the igniter, the resulting products of combustion are exhausted in multiple blasts under pressure through the nozzles 16, and the rocket motor is propelled forwardly in the usual manner. When the pressure in the motor tube 10 exceeds a predetermined amount, it acts to shear the disk 21 and blow the disks 23 and 24 and the material 25 rearwardly out of the central port 18. As a result, the relief port 18 functions as a nozzle to supplement the nozzles 16 in driving the rocket. It will be apparent that the insulating disks 23 and 24 and the material 25, while not appreciably affecting the resistance of disk 21 to shearing, act to minimize the application of heat to the shear disk 21 from the interior of motor 10. The conical clearance space 19 not only makes the relief port 18 more efficient as a nozzle, but also facilitates clearing of the parts from the port 18 when disk 21 is sheared.

It has been found that the normal safe temperature limit of 150° F. within the motor 10 may be increased with the use of the new relief valve to about 200° F. This added range of temperature may be made available at the lower end or the upper end, or both, of the normal temperature range in the motor, depending upon the choice of propellant, its size and shape, and the nozzle diameter. Further, no weight is added to the rocket to provide the relief means. If anything, the weight of the nozzle block 15 may actually be reduced. Also, since the relief port 18 is centrally located and directed rearwardly, no appreciable forces are exerted by discharge of gases through the relief port which would tend to increase dispersion of the rocket.

A modified form of the view pressure relief means is shown in Figs. 4 and 5. As there shown, the nozzle block 15a is threaded into the rear end of motor tube 10, and the nozzles 16 are provided with throat liners 16a. The central port and its clearance socket in the nozzle block 15a are of somewhat different form, as shown at 18a and 19a, respectively. The shoulder 20a in port 18a supports a flat shear disk 21a which is clamped against the shoulder by a ring nut 22a threaded into the front end of port 18a. In front of the nozzle block 15a, the ring nut 22a supports a cage 33 which is closed at its front end, as shown at 33a, and is provided with lateral holes 34. The inner end of the cage 33 supports a cross-shaped end plate or grid 35 having a central pin 36 extending into the cage for supporting the plate 35. In the construction illustrated, the end plate 35 is adapted to support a propellant grain (not shown) of cruciform cross section. The propellant grain may, however, be triform in cross section or otherwise shaped, in which case the end plate is modified accordingly.

In order to minimize application of heat to the shear disk 21a, the interior of the ring nut 22a is filled with an insulating material 37. This may be asbestos fiber packed therein and mixed with a suitable binder, or it may be a putty-like material such as permatex or an assembly similar to that shown in Fig. 1.

The operation of the device shown in Figs. 4 and 5 is similar to that of the device previously described, except that the pressure from combustion of the propellant grain reaches the shear disk 21a and relief port 18a through the cage openings 34.

The rocket motors illustrated are of the non-rotating or non-spinning type. The relief means, however, are equally adaptable to a rotating or spinning type of rocket motor, such as shown in a copending application of C. E. Weinland, Ser. No. 564,337, filed November 20, 1944. The rotating rocket there shown differs principally in that the axes of the nozzles are tilted to impart rotation, and the fins as well as lug bands are omitted.

We claim:

1. A rocket motor comprising a motor tube, a nozzle block at the rear end of said motor tube, said nozzle block having a central pressure relief port and a plurality of nozzle openings spaced around said relief port, and a pressure responsive means normally closing said relief port and operable under pressure to open said port.

2. A rocket motor comprising a motor tube, a nozzle block at the rear end of said motor tube, said nozzle block having a central pressure relief port counterbored to form a coaxial cavity and shoulder and a plurality of nozzle openings spaced around said relief port, a shear disk resting on the shoulder to normally close said relief port, and heat insulation means occupying the cavity contiguously to the disk, shielding said disk from heat within said motor tube.

3. A rocket motor comprising a motor tube, a nozzle block at the rear end of said motor tube, said nozzle block having a central pressure relief port and a plurality of nozzle openings spaced around said relief port, a pressure responsive means normally closing said relief port and operable under pressure in the tube to open the port, and a perforated cage over said relief port within said motor tube for supporting a propellant.

4. In a rocket motor having a motor tube, the combination of a nozzle block in the rear end portion of said tube and having a plurality of nozzle openings spaced around the block near the periphery thereof, the block also having a pressure relief port centrally disposed with respect to the nozzle openings, said port being flared at its rear end portion to provide the port with nozzle characteristics, a forwardly facing shoulder in said port, a shear disk seated on the shoulder, a ring member secured in the port for holding the shear disk against the seat, and heat insulation means packed closely in the ring for shielding said disk from heat within the motor tube.

5. In a rocket motor having a motor tube, the combination of a nozzle block in the rear end portion of said tube and having a plurality of nozzle openings spaced around the block near the periphery thereof, the block also having a pressure relief port centrally disposed with respect to the nozzle openings, said port being flared at its rear end portion to provide the port with nozzle characteristics, a forwardly facing shoulder in said port, a shear disk seated on the shoulder, a ring member secured in the port for holding the shear disk against the seat, the inner wall of the ring member being substantially flush with the inner wall of the shoulder, asbestos disk means fitted closely in the ring member and engaging the front face of the shear disk to shield the shear disk from heat within the motor tube, and a putty-like material filling substantially the remainder of the ring member in front of said disk means.

CHARLES C. LAURITSEN.
OLIN C. WILSON.

REFERENCES CITED

The following references are of record in the file of this patent:

UNITED STATES PATENTS

| Number | Name | Date |
|---|---|---|
| 2,400,242 | Malina et al. | May 14, 1946 |
| 2,422,721 | Farr | June 24, 1947 |